(12) United States Patent
Sreeramoju (10) Patent No.: US 9,667,560 B2
(45) Date of Patent: May 30, 2017

(54) FLOW SEQUENCING (71) Applicant: Nicira, Inc., Palo Alto, CA (US)

(72) Inventor: Akshay Kumar Sreeramoju, San Jose, CA (US)

(73) Assignee: NICIRA, INC., Palo Alto, CA (US)

(*) Notice: Subject to any disclaimer, the term of this patent is extended or adjusted under 35 U.S.C. 154(b) by 47 days.

(21) Appl. No.: 14/583,038

(22) Filed: Dec. 24, 2014

(65) Prior Publication Data

US 2016/0191400 A1    Jun. 30, 2016

(51) Int. Cl.
*H04L 12/801* (2013.01)
*H04L 29/06* (2006.01)

(52) U.S. Cl.
CPC .............. *H04L 47/34* (2013.01); *H04L 69/22* (2013.01)

(58) Field of Classification Search
CPC ................................ H04L 47/34; H04L 69/72
USPC ........................................................ 370/474
See application file for complete search history.

(56) References Cited

U.S. PATENT DOCUMENTS

| 6,650,640 B1* | 11/2003 | Muller | H04L 49/90 370/392 |
|---|---|---|---|
| 2005/0036619 A1* | 2/2005 | Funnell | H04L 47/34 380/256 |
| 2006/0168380 A1* | 7/2006 | Benner | H04L 49/101 710/110 |
| 2014/0188891 A1* | 7/2014 | Nath | G06F 17/30613 707/741 |

FOREIGN PATENT DOCUMENTS

GB    WO2014155043    * 10/2014    ......... H04L 12/875

* cited by examiner

*Primary Examiner* — Ronald B Abelson
(74) *Attorney, Agent, or Firm* — Adeli LLP (57) ABSTRACT

Some embodiments of the invention provide a method for assigning a data flow-specific sequential value to each packet of a data flow that is sent from a source endpoint to a destination endpoint in a network. In some embodiments, the source endpoint receives the data flow from a source application while the destination endpoint delivers the data flow to a destination application. The method of some embodiments assigns separate monotonically incrementing values to the packets of each data flow between the same two endpoints by inserting the incremental values into the IPv4 identification field in each packet's IP header. Some embodiments use this sequential value in order to discover any potential error condition in packet transmission. Some embodiments use the IPv4 identification field values to calculate the transmission rate of a data flow at only one observation point.

20 Claims, 9 Drawing Sheets

FLOW SEQUENCING

BACKGROUND

Packet fragmentation has traditionally been used as part of transmitting data flows in TCP/IP networking. That is, when the size of an Internet Protocol version 4 (IPv4) packet exceeds a particular maximum transmission unit (MTU) of a particular link of a network, a forwarding element of the network (e.g., load balancers, routers, etc.) fragments the packet to two or more smaller packets which can pass through the links with the particular MTU. In response to this challenge, a specific mechanism has been implemented in the IP layer to ensure that the fragmented packets will be reassembled at the destination point. This mechanism employs the Internet Protocol version 4 (IPv4) identification field in the packet's IP header to identify and reassemble the fragmented packets. The IPv4 identification field carries a monotonic incremental value for each IP packet sent by a particular source. When a packet is fragmented, all the fragmented packets will have the same value in their IPv4 identification fields as the original packet. The fragmented packets, however, will have different fragment offsets from each other. Therefore, when the destination point receives the fragmented packets, by looking at the IPv4 identification fields and the offsets of the packets, it would be able to reassemble the fragmented packets to their corresponding original packets.

Figure 1:
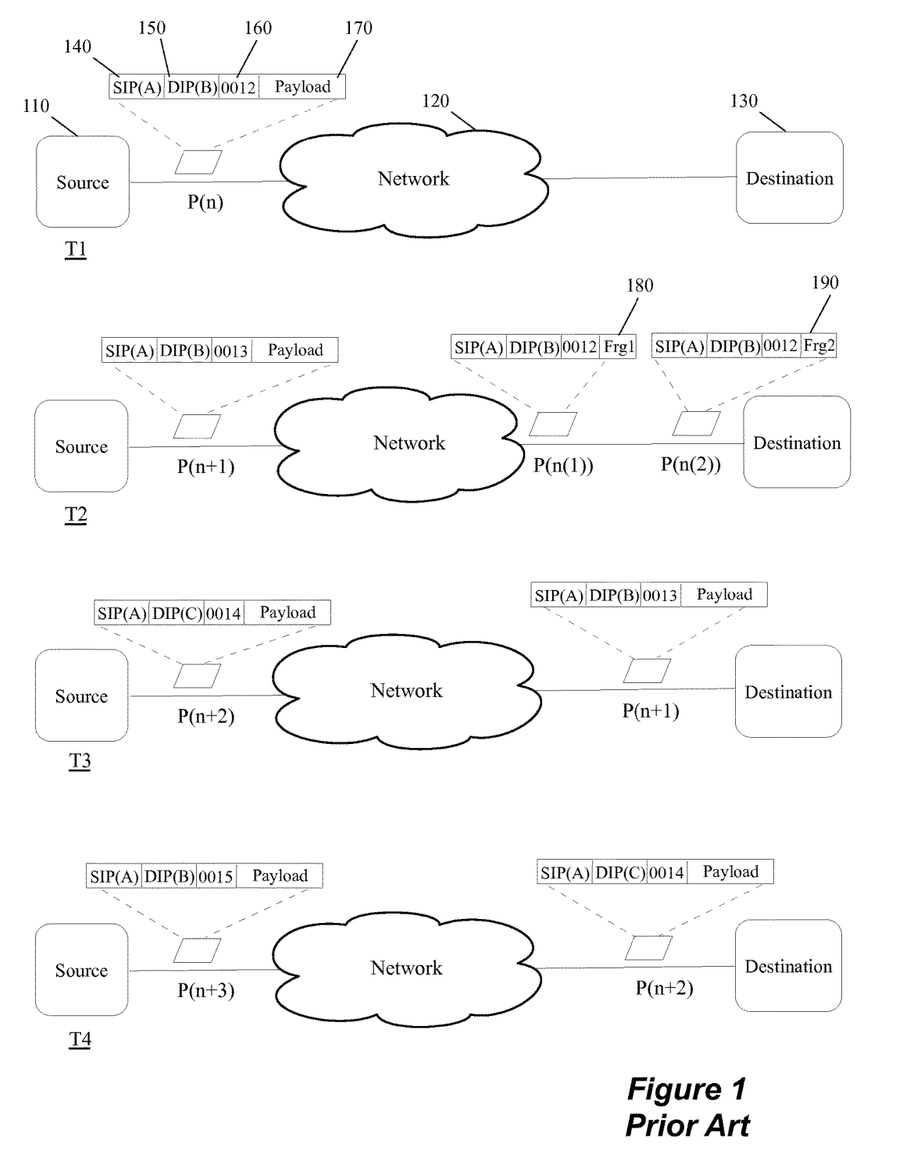
FIG. 1 illustrates how the IPv4 identification field has been traditionally used in the IP layer for defragmentation of the fragmented packets.

FIG. 1 illustrates how the IPv4 identification field has been traditionally used in the IP layer for defragmentation of the fragmented packets. The figure shows transmission of packets from a source 110 to a destination 130 through a network 120 at four different points of time T1-T4. At time T1, a packet P(n) has been sent out from the source towards the destination. Packet P(n) has an IP header with different fields. Three of such IP header fields that are shown in the figure are source IP field 140, destination IP field 150, and IPv4 identification field 160. The source IP address of the packet, in this example is A while the destination IP address is B. The IPv4 identification field's value is 12 which shows that at time T1, the packet P(n) is the $12^{th}$ packet that was sent from the source (assuming that the IPv4 identification field's value for the first packet was 1, and that for each subsequent packet sent from the source, the value of the IPv4 identification field incremented by 1). Lastly, payload field 170 contains the data that is being carried within the packet from source application with source IP address A to the destination application with the destination IP address B.

At time T2, a second packet P(n+1) with the same source and destination IP addresses has been transmitted from the source. As the result, the IPv4 identification field's value is incremented to 13. This stage also shows that the packet P(n) has been fragmented to two fragmented packets P(n(1)) and P(n(2)) each of which having the same IPv4 value (12) as the packet P(n). Also, each fragmented packet carries a portion of the payload of the packet P(n) which are frg1 180 and frg2 190. At time T3, a third packet P(n+2) has been transmitted out from the source that belongs to a different data flow and the value of the IPv4 identification field has continued to increment to 14. At time T4, a fourth packet that belongs to the first data flow has been transmitted and its IPv4 value has continued to increment to 15.

Because the design of the IP suite is based on the end-to-end principle, the network infrastructure is considered inherently unreliable at any single network element or transmission medium. As a consequence of such design, the IP layer only provides best effort delivery and its service is characterized as unreliable. In network architectural language, it is a connectionless protocol, in contrast to connection-oriented modes of transmission. As such, various error conditions such as packet loss, duplication and out-of-order delivery of packets may occur. Therefore, in TCP/IP networking, it is always desirable to perform diagnoses on a data flow to identify such conditions.

BRIEF SUMMARY

Some embodiments of the invention provide a novel method for assigning a data flow-specific sequential value to each packet of a data flow that is transmitted from a source endpoint to a destination endpoint in a network. An endpoint, in some embodiments, is a virtual machine or any other data compute node that is capable of originating data flows. In some embodiments the data compute nodes execute on one or more computing machines (e.g. host machines) of a network (e.g., a data center). In some embodiments, an endpoint is an edge forwarding element (e.g., a hardware switch, a software virtual switch, etc.) to which the virtual machines or data compute nodes directly couple.

In some embodiments, the source endpoint transmits different data flows (e.g., from different source applications) and the destination endpoint delivers the different data flows (e.g., to different destination applications). The source endpoint of some embodiments uses a particular field of the Internet Protocol (IP) header of each packet in each data flow in order to insert an incremental value to the packet of that data flow. In some embodiments, this particular field is the 16-bit Internet Protocol version 4 (IPv4) identification field of the IP header of the packet. In other words, the method of some embodiments assigns separate monotonically incrementing values to the packets of each data flow between the same two endpoints by inserting the incremental values into the IPv4 identification field in each packet's IP header.

The IPv4 identification field of the IP header has traditionally been used to enable reconstruction of an IP packet when the packet is fragmented into several IP packets. However, because of the high speed and large bandwidths of the links and transmission paths in the networks, many network systems do not require packet fragmentation in transmitting data flows. Therefore, in order to sequence the packets of each data flow separately, the method of some embodiments sets a do not fragment (DNF) bit in the IP header of the packets of the data flow before inserting the sequential value to each packet's IPv4 identification field. Setting the DNF bit in the IP header of the packets essentially prevents the fragmentation of packets by the forwarding elements (e.g., hardware or software-defined forwarding elements) that are placed along the transmission path of the packets between the two endpoints.

The sequential values inserted in the IPv4 identification fields of the IP headers of the packets of each data flow, in some embodiments, can be used to discover various packet transmission errors. The transmission errors can occur at any point along the transmission path of the packets after the packets are sent out from the source endpoint. The use of the sequential values in successive packets of a data flow enables the detection of packet transmission errors at a single observation point (e.g., a middlebox along the transmission path, the destination endpoint, etc.) without requiring any additional data (e.g., data flow details, data flow statistics, etc.) from the source of the packets.

The point of observation in some embodiments is the destination endpoint. In some other embodiments the point of observation can be a network element (e.g., a forwarding element such as a router, switch, etc., or a middlebox) along the transmission path of the data flow. A few examples of packet transmission errors that can be discovered by only one point of observation (i.e., the destination endpoint or the forwarding element that captures the packets) are loss of data packets originated from the source endpoint, delay in packets originated from the source endpoint, duplication of packets, and out-of-order delivery of the packets of a data flow.

In some embodiments, the sequential values inserted in the IPv4 identification fields of the IP headers of the packets received at the destination endpoint or captured by a network element are used to evaluate the packet transmission rate for a particular data flow. In order to perform such evaluations, instead of capturing every single packet and sampling the packets on a continuing basis, some embodiments simply calculate the difference in the inserted values of the IPv4 identification fields of two packets that are captured at two different points of time. The network element then determines the packet transmission rate of the data flow based on such calculation. The discovered errors and the calculated transmission rates can then be used by the network administrator, the endpoints, and/or the middle boxes, in order to optimize the transmission of the data flows in Transmission Control Protocol/Internet Protocol (TCP/IP) networking.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a novel method for assigning a data flow-specific sequential value to each packet of a data flow that is transmitted from a source endpoint to a destination endpoint in a network. An endpoint, in some embodiments, is a virtual machine or any other data compute node that is capable of originating data flows. In some embodiments the data compute nodes execute on one or more computing machines (e.g. host machines) of a network (e.g., a data center). In some embodiments, an endpoint is an edge forwarding element (e.g., a hardware switch, a software virtual switch, etc.) to which the virtual machines or data compute nodes directly couple.

In some embodiments, the source endpoint transmits different data flows (e.g., from different source applications) and the destination endpoint delivers the different data flows (e.g., to different destination applications). The source endpoint of some embodiments uses a particular field of the Internet Protocol (IP) header of each packet in each data flow in order to insert an incremental value to the packet of that data flow. In some embodiments, this particular field is the 16-bit Internet Protocol version 4 (IPv4) identification field of the IP header of the packet. In other words, the method of some embodiments assigns separate monotonically incrementing values to the packets of each data flow between the same two endpoints by inserting the incremental values into the IPv4 identification field in each packet's IP header.

The term "packet" is used above as well as throughout this application to refer to a collection of bits in a particular format sent across a network. It should be understood that the term "packet" may be used herein to refer to various formatted collections of bits that may be sent across a network, such as Ethernet frames, TCP segments, UDP datagrams, IP packets, etc.

The IPv4 identification field of the IP header has traditionally been used to enable reconstruction of an IP packet when it is fragmented into several IP packets. However, in some embodiments, some upper layer protocols discover the maximum transmission unit (MTU) along the transmission path of the data flows. The discovered MTU defines the maximum size of a packet before fragmentation on the links of the transmission path. The upper layer protocols of some embodiments then limit the size of data packets to less than the discovered MTU. Because of this the data packets will not need to be fragmented in their path. Such upper layer protocols, in some embodiments, further enforce the forwarding elements (e.g., middleboxes, routers, etc.) not to fragment the data packets by setting the DNF bit in the IPv4 identification field of the header of the data packets.

Therefore, in order to sequence the packets of each data flow separately, the method of some embodiments sets a do not fragment (DNF) bit in the IP header of the packets of the data flow before inserting the sequential value to each packet's IPv4 identification field. Setting the DNF bit in the IP header of the packets essentially prevents the fragmentation of packets by the forwarding elements (e.g., hardware or software-defined forwarding elements) that are placed along the transmission path of the packets between the two endpoints.

Figure 2:
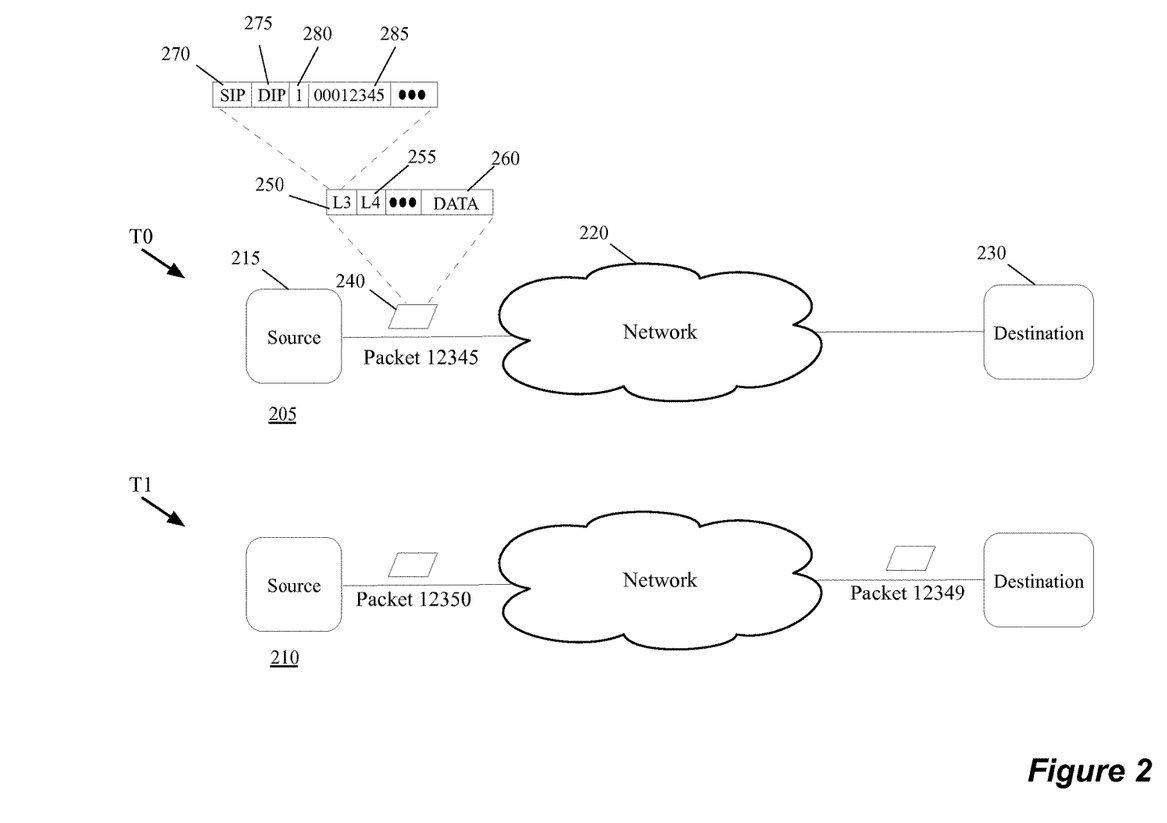
FIG. 2 illustrates a general overview of how the method of some embodiments sequences the packets of a data flow.

FIG. 2 illustrates the sequencing of packets of a data flow according to some embodiments. More specifically, this figure shows, at two different stages 205 and 210, how the method sequences each packet that belongs to a data flow by inserting a sequential value that is unique for each packet into the IP header of the packet. In an IP suite, a data flow is a set of packets that share the same five-tuple (i.e., source IP address, destination IP address, source transport port number, destination transport port number, and transport protocol).

As illustrated at stage 205 of FIG. 2, the source endpoint 215 has transmitted packet 240 towards destination endpoint 230 via network 220. As stated above, in some embodiments, the endpoints are VMs or other data compute nodes (e.g., the TCP/IP stack operating on a VM) while in some other embodiments the endpoints are edge forwarding elements that connect the VMs or other data compute nodes to the network (e.g., a software virtual switch).

As shown in the figure, the packet includes a L3 (IP) header 250, a L4 (TCP, in this case) header 255, several other packet header fields such as L2 addresses, etc. (not shown), and also packet payload data 260. From the perspective of the IP header, the TCP header 255 and any higher-level headers are considered part of the payload (along with the data), while from the perspective of the TCP header 255 the higher-level headers and the data are considered part of the payload.

Each of the headers includes several other fields that carry different information about the packet. For instance, the TCP header 255 identifies source and destination transport-layer port numbers of the packet (not shown). The IP header 250, as illustrated, is divided into different fields such as a source IP (SIP) field 270, a destination IP (DIP) field 275, a Do Not Fragment (DNF) bit 280, an IPv4 identification field 285, etc. As stated above, after setting the DNF bit 280, the source endpoint inserts a unique sequential value in the IPv4 identification field 275 of each packet of a flow. Stage 205 shows that at time T0, the method has assigned the sequential value 012345 to the packet by inserting this value into the IPv4 identification field of the packet's IP header. This stage also shows that the DNF bit in the IP header is set (i.e., the bit is set when its value is 1), so that intervening forwarding elements between the source and the destination will not fragment the packet.

The next stage 210 shows that after a lapse of time, at time T1, the source endpoint has assigned another sequential value 012350 to another packet of the data flow that is transmitted out from the source endpoint 215 to the destination endpoint 230. The method has done so by inserting this value (012350) into the IPv4 identification field of the IP header of the packet. Between times T0 and T1, the method has assigned values 012346-012349 to their corresponding packets of the same data flow (not shown). The stage 210 also shows that the last packet before the packet 012350, which was assigned the value 012349, has been transmitted through the network 220 (i.e., one or more forwarding elements) to the destination endpoint.

The packet sequencing of some embodiments is described above. The following sections describe such packet sequencing and its uses in several more detailed embodiments. Section I describes the packet sequencing process performed by the source endpoint. Next, Section II describes how packet sequencing can be used by some embodiments to discover packet transmission errors at only one point of observation, while Section III describes the evaluation of packet transmission rate at one point of observation and without the need to sample packets on a continuous basis. Finally, Section IV describes an electronic system with which some embodiments of the invention are implemented.

I. Packet Sequencing Process

Figure 3:
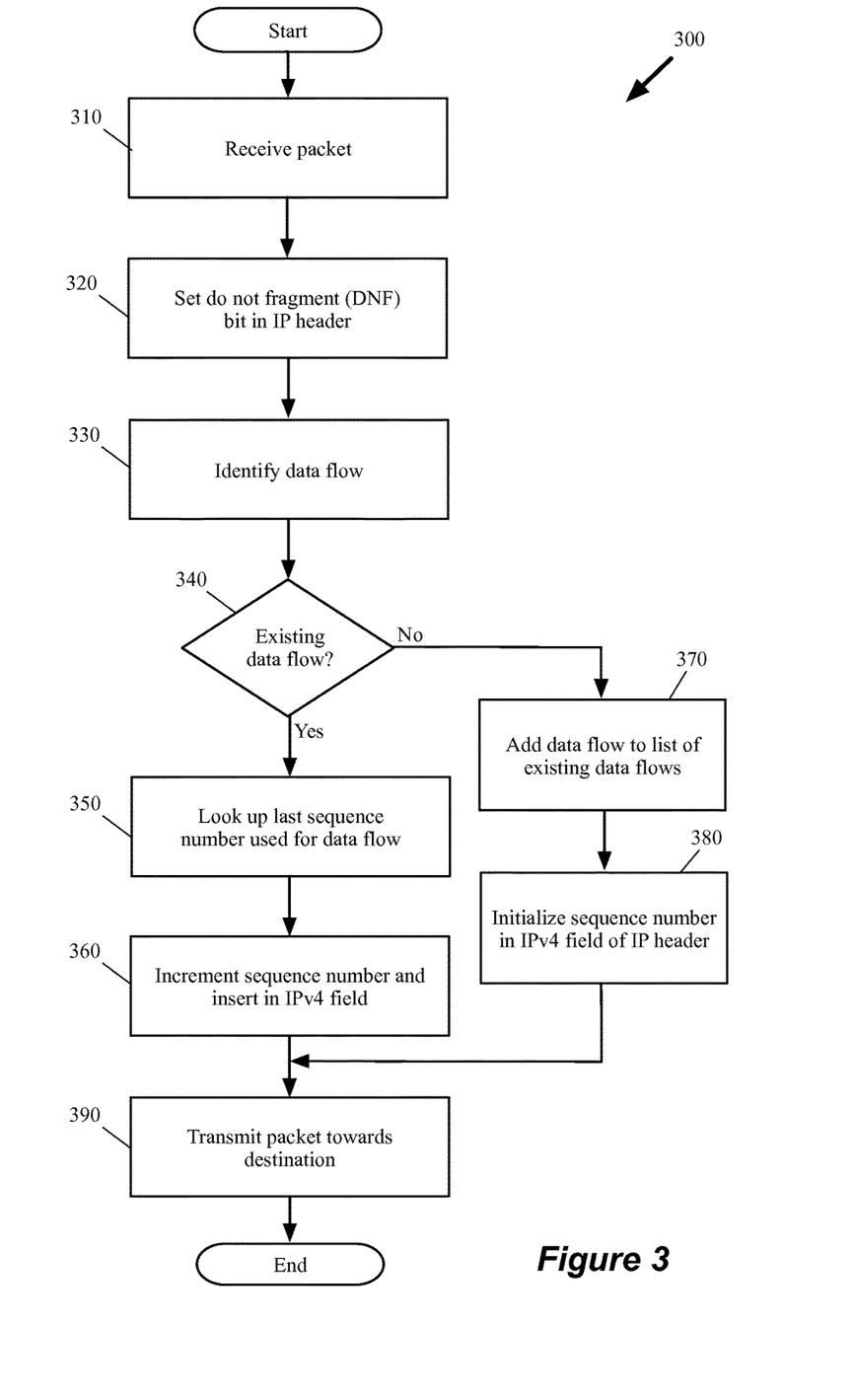
FIG. 3 conceptually illustrates a process of some embodiments for sequencing the packets of different data flows established between a pair of endpoints.

FIG. 3 conceptually illustrates a process 300 of some embodiments for sequencing the packets of different data flows established between a pair of endpoints. More specifically, this figure shows how a forwarding element receives different data flows from different source applications and adds separate sequential values to the packets of each data flow separately. In some embodiments the process 300 is implemented by the source endpoint (e.g., a VM or other data compute node, a virtual switch operating on a host machine with multiple VMs, etc.), or by a forwarding element along the transmission path of the data flow.

The process 300 begins by receiving (at 310) a packet in a data flow. As an example, the packet might be received by the TCP/IP stack of a VM from an application executing on the VM. In some embodiments, the process 300 is only performed by the endpoint for outgoing packets (i.e., packets for which the endpoint is the source), and not for incoming packets. The process 300 then sets (at 320) the do not fragment (DNF) bit in the IP header of the packet (e.g., by changing the DNF bit's value to "1"). The process does so to ensure that the packet will not get fragmented by any forwarding element along the transmission path of the packet.

Next, the process 300 identifies (at 330) the data flow to which the received packet belongs. In some embodiments, the source endpoint examines the connection 5-tuple in the network and transport layer headers. Any two simultaneous connections (data flows) between two endpoints will have a different 5-tuple—for example, if two applications on a first VM are connected to two other applications on a second VM, while the source and destination IP addresses (and possibly the transport protocol) will be the same, the transport port numbers will be different for the two connections, resulting in different 5-tuples.

After identifying the data flow, the process determines (at 340) whether the data flow of the received packet is an existing data flow. In other words, the endpoint determines whether the packet is the first packet in a new data flow, or whether previous packets for the data flow have been processed and sent by the endpoint. In some embodiments, the endpoint makes such a determination by storing a list of ongoing data flows, and checking the new packet against this list. Some embodiments purge data flows from this list after a particular duration in which no packets are received for the flow (e.g., thirty seconds, one minute, five minutes, etc.). In some embodiments, the source endpoint identifies a TCP SYN packet (or equivalent handshake-opening packet) as a first packet of a data flow, and other packets as belonging to existing data flows. Also, in some embodiment, the TCP FIN/RST packets are used to identify data flow termination (allowing for the removal of a data flow from the set of existing data flows).

When the process determines that the data flow is a new data flow, the process adds (at 370) the data flow to its list of existing data flows (e.g., the list of ongoing data flows). The process then initializes (at 380) the IPv4 identification field of the IP header of the packet with a first value in a sequence and proceeds to 390 which will be described below. Some embodiments use the entire 16-bits of the IPv4 identification field, and begin with the value 1 for the first packet of each data flow.

On the other hand, if the process determines that the data flow is one of the existing data flows (e.g., the process finds the data flow in the list of existing data flows), the process looks up (at 350) the sequential value that has been inserted into the IPv4 identification field of the previous packet of the data flow. The process then increments (at 360) the sequential value and inserts the incremented value to the IPv4 filed of the received packet. Finally, at 390, the process 300 transmits the packet towards the destination endpoint.

Some embodiments perform variations of the process 300. The specific operations of the process 300 may not be performed in the exact order shown and described. For example, the process of some embodiments sets the DNF bit in the IP header of the packets after the process inserts the initial or incremented value to the IPv4 identification field of the IP header of the packets. Additionally, the specific operations may not be performed in one continuous series of operations, and different specific operations may be performed in different embodiments.

Figure 4:
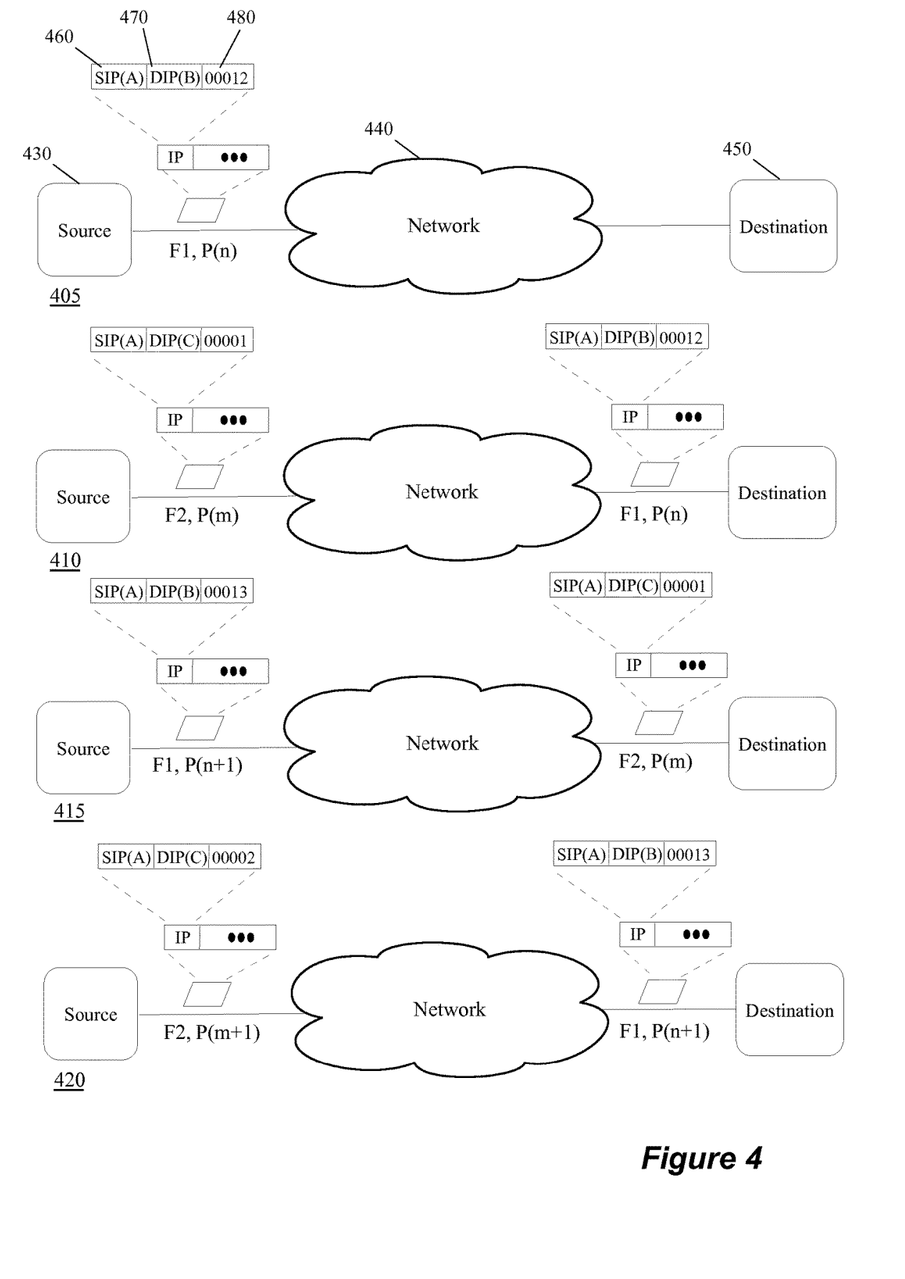
FIG. 4 illustrates how the method of some embodiments sequences the packets of different data flows that are established between a couple of endpoints.

FIG. 4 illustrates how the method of some embodiments sequences the packets of different data flows that are established between a source endpoint and a destination endpoint. More specifically, FIG. 4 illustrates, in four stages 405-420 which represent four different points of time T1-T4, sequencing of the packets that belong to different data flows, and that are transmitted from a source endpoint 430 to a destination endpoint 450 through a network 440. This figure shows how the method of some embodiments, unlike the prior art described by reference to FIG. 1 above, keeps track of the different data flows and assigns different sequential values to the packets of the different data flows.

The first stage 405 illustrates that at time T1 the source endpoint 430 (e.g., the edge forwarding element of a host machine) has transmitted out the packet P(n) which belongs to a first data flow F1. The IP header of the packet P(n) includes a source IP (SIP) address field 460, a destination IP (DIP) address field 470, and an IPv4 identification field 480. The DNF bit and other fields of the IP header as well other fields of other packet headers (e.g., TCP header) are not shown for simplicity of the description. As shown at time T1, the packet has a source IP address A, a destination IP address B, and an IPv4 identification field value of 12. In other words, the data flow F1 has a source IP address of A and a destination IP address of B as well as source and destination ports that are not shown in the figure.

The second stage 410 illustrates that at time T2 the source endpoint 430 has transmitted out another packet P(m) which belongs to a second data flow F2. The source might differentiate between the first data flow and the second data flow by looking at the 5-tuples of the packets. As shown in stage 410, the source IP (SIP) address field 460 of the IP header of the packet P(m) includes the same source IP address of A (indicating that the second packet is originated at the same source as the first packet). However, the destination IP (DIP) address field 470 in this stage includes a different destination IP address of C. Therefore, the source endpoing uses a second sequence for this new data flow and has initialized the IPv4 identification field 480 of the IP header of the packet P(m) with number 1, as the first value of this second sequence. This second data flow, as will be described in more detail below by reference to FIG. 6, could have been initiated by the same application as the first data flow or a different application operating on the same machine. When the source endpoint is an edge forwarding element, the different data flows could also have different source IP addresses (i.e., the packets could be coming from different machines). This stage also shows that packet (n) of the first data flow F1 has passed through the network 440 and is being received by the destination endpoint 450.

The third stage 415 shows that at time T3 the source endpoint 430 has transmitted out the next packet P(n+1) in the first data flow F1. As shown in stage 415, the source IP (SIP) address field 460 of the IP header of the packet P(n+1) includes the same source IP address of A. Also, the destination IP (DIP) address field 470 includes the same destination IP address of B which the IP header of the packet P(n) had. Though not shown, the transport protocol and port numbers are also the same as the first packet P(n). Therefore, the source endpoint identifies that the packet P(n+1) belongs to the same data flow as the packet P(n) (i.e., the first data flow F1), and thus increments the value that was last inserted in the IPv4 identification field 480 of the IP header of the packet P(n) and inserts the incremented value (i.e., 13) into the IPv4 identification field of the IP header of the packet P(n+1). This stage also shows that packet (m) of the second data flow F2 has passed through the network 440 and is being received by the destination endpoint 450.

The fourth stage 420 illustrates that at time T4 the source endpoint 430 has transmitted yet another packet P(m+1) in the second data flow F2. As shown in stage 420, the source IP address field 460 and destination IP address field 470 of packet P(m+1) have the same values as those of packet P(m). In addition, though not shown, the transport protocol and port numbers are also the same. Therefore, the source endpoint identifies that the packet P(m+1) belongs to the same data flow as the packet P(m) (i.e., the second data flow F2), and thus increments the value that was last inserted in the IPv4 identification field 480 of the IP header of the packet P(m) and inserts the incremented value (i.e., 2) into the IPv4 identification field of the IP header of the packet P(m+1). This stage also shows that packet (n+1) of the first data flow F1 has passed through the network 440 and is being received by the destination endpoint 450.

It should be understood that the sequences of the packets and the data flows shown in FIG. 4 at four different points of time T1-T4 serve only as examples and to simplify the description. For example, a source endpoint may transmit numerous packets in a row that belong to a first data flow before transmitting packet of any additional data flows. Conversely, a source endpoint may send multiple packets belonging to multiple different data flows before receiving a second packet from the first data flow for transmission.

II. Discovering Packet Transmission Errors

The sequential values inserted in the IPv4 identification fields of the IP headers of the packets of each data flow, in some embodiments, can be used to discover various packet transmission errors. The transmission errors can occur at any point along the transmission path of the packets after the packets are sent out from the source endpoint. The use of the sequential values in successive packets of a data flow enables the detection of packet transmission errors at a single observation point (e.g., a middlebox or forwarding element along the transmission path, the destination endpoint, etc.) without requiring any data from the source of the packets.

The point of observation in some embodiments is the destination endpoint. In some other embodiments the point of observation can be an intervening network element (e.g., a middlebox, a router, etc.) along the transmission path of the data flow. A few examples of packet transmission errors that can be discovered by only one point of observation (i.e., the destination endpoint or the forwarding element that captures the packets) are loss of packets originated from the source endpoint, delay in packets originated from the source endpoint, duplication of packets, and out-of-order delivery of the packets of a data flow.

Figure 5:
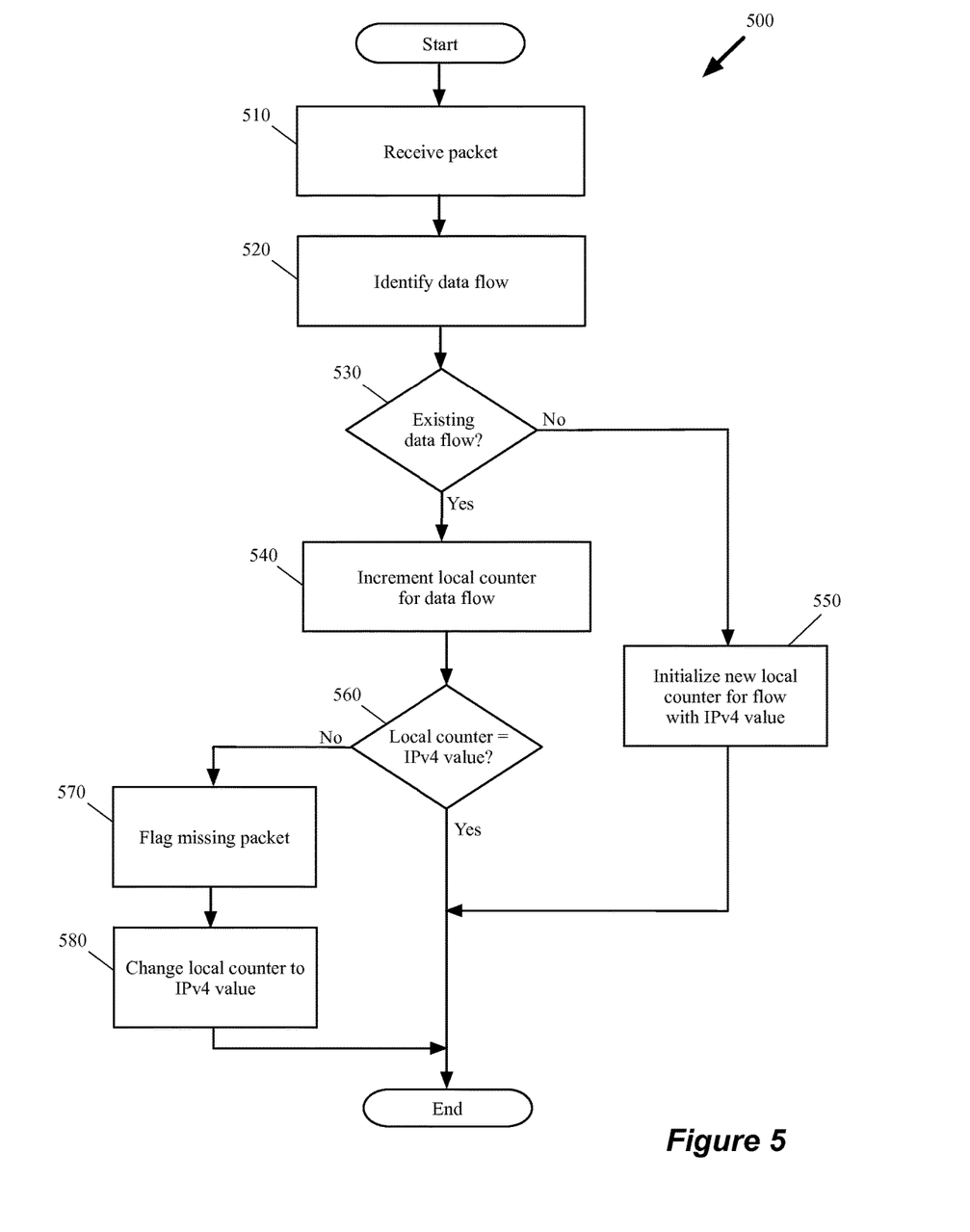
FIG. 5 conceptually illustrates a process of some embodiments that discovers packet transmission errors.

FIG. 5 conceptually illustrates a process 500 of some embodiments that discovers packet transmission errors or non-sequential receipt of packets in a data flow. In some embodiments, the process 500 is implemented by a destination endpoint while in other embodiments the process is implemented by a network element along the transmission path of the data flow. FIG. 5 will be described by reference to FIG. 6 which illustrates an example of how the process 500 identifies the potential transmission errors in some embodiments. Although in many embodiments described above and below, a method for discovering transmission errors is described, in some embodiments the point of observation does not necessarily discover an error in transmission per se. Instead, the point of observation of some embodiments may simply report that not all the packets of a data flow, originated from the source endpoint, have received by or passed through the observation point.

The process 500 begins by receiving (at 510) a packet of a data flow. For a destination endpoint, some embodiments only perform the process for incoming packets (i.e., packets received from a connection to external networks), and not for outgoing packets (instead, the process 300 might be performed to sequence the packets of each outgoing data flow).

The process then identifies (at 520) the data flow to which the received packet belongs. In order to do so, the network element of some embodiments examines the 5-tuple of the packet. Each 5-tuple, as indicated above, identifies a unique data flow (at least among current data flows; two non-simultaneous data flows between the same two endpoints might have the same 5-tuple).

After identifying the data flow, the process determines (at 530) whether the received packet belongs to an existing data flow. That is, the network element determines whether any previous packets have been received with the same 5-tuple. In some embodiments, the network element stores a list of ongoing data flows for which it has received packets within a particular time duration. This list or other structure, in some embodiments, stores a packet counter that corresponds to the most recently received sequencing number for the data flow.

When the packet belongs to a new data flow, the process proceeds to 550, which will be described below. On the other hand, when the packet belongs to an existing data flow, the process increments (at 540) the value of the local counter for that data flow and then determines (at 560) whether the value of the IPv4 filed of the received packet is equal to the value of the local counter. If the process 500 determines that the two values are equal (i.e., there has been no loss of packets in the sequence) the process ends. As the counter for a particular data flow stores the sequencing value of the previous packet received for that data flow, when the incremented counter value equals the sequencing value in the new packet, then the network element has received the next packet sent by the source endpoint of the data flow (i.e., no packets have missed the network element).

Figure 6:
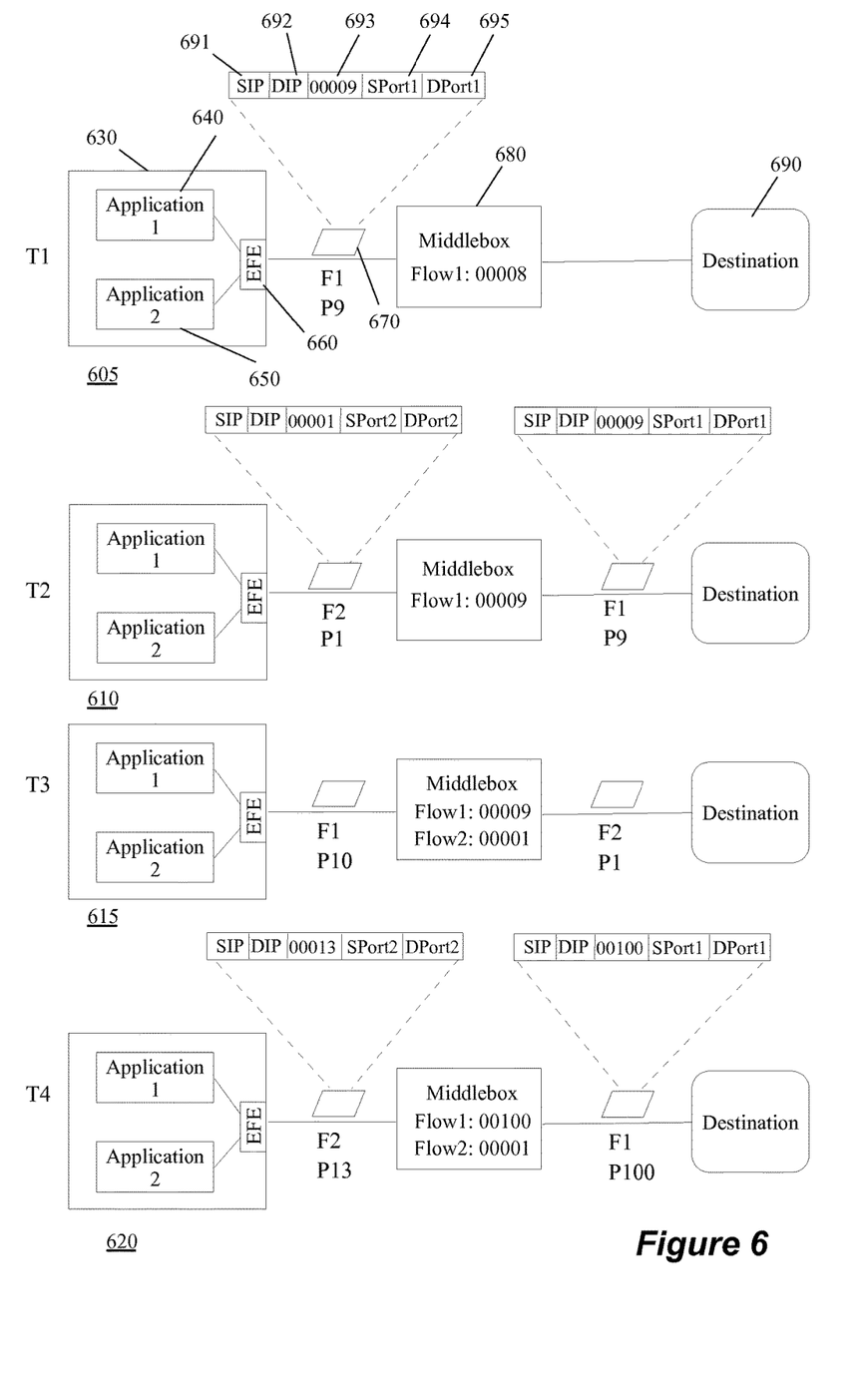
FIG. 6 illustrates how the method of some embodiments keeps track of the sequences of packets in different data flows at only one observation point.

FIG. 6 illustrates, in four stages 605-620, how the method of some embodiments keeps track of the sequences of packets in different data flows at only one observation point using the IPv4 identification fields of the packets. The first stage 605 illustrates a source computing machine 630, a middlebox 680, and a destination endpoint 690. The computing machine 630 (e.g., a host machine in a network) includes two different applications 640 and 650, and an edge forwarding element 660 (e.g., a software virtual switch). In this case, the two applications execute on a single virtual machine that runs on the host machine. In some other embodiments, the two applications could operate on two different virtual machines in the same host. In this example, the edge forwarding element 660 acts as the source endpoint to perform packet sequencing for all the packets of different data flows from the two applications 640 and 650 (as well as any other applications on the same or different virtual machines of the same host). In some embodiments, the network stack of the VM on which the applications 640 and 650 operate would perform the packet sequencing.

The first stage 605 shows that at time T1 the middlebox 680 receives the packet P9 of the data flow F1 from the source endpoint 660. The middlebox 680 could be a load balancer, firewall, etc. In addition, the counting could be performed by a forwarding element such as a router in other embodiments. The packet P9 is originated from the Application 1 executing on the computing machine 630. The packet P9 has a source IP address 691 and destination IP address 692, and the IPv4 identification field 693 which carries the number 9 meaning that this is the $9^{th}$ packet in the first data flow F1 sent by the source endpoint. Additionally, the TCP header of the packet P9 includes the source port 694 (SPort1) and the destination port 695 (DPort1). Also this stage shows that the middlebox 680 has already set its local counter for data flow F1 (i.e., Flow1) to number 8. This confirms that between the last packet in the data flow F1 that the middlebox has received and the next packet of the data flow F1 that the middlebox is going to receive, no packet has been lost or missed.

The second stage 610 shows that at time T2 the middlebox 680 receives a new packet P1 from the source endpoint 660. However, as indicated by the data in the TCP header, the source and destination ports of this packet (SPort2 and DPort2) are different than the source and destination ports of packet P9 in the first stage. As such, this packet belongs to a second data flow F2 initiated by the second application. The source and destination machines are the same in both flows, and thus the two flows have the same source and destination IP addresses. As illustrated, because the packet belongs to a different data flow, the source endpoint 660 has initialized the IPv4 identification field in the IP header of the packet with a new sequence by inserting number 1 in the IPv4 identification field 693. This stage also shows that packet P9 of the first data flow F1 has been transmitted out of the middlebox and is being received by the destination endpoint 690. The local counter in the middlebox for the first data flow F1 has also been incremented from 8 to 9.

Returning to FIG. 5, when the process determines (at 530) that the data flow of the received packet does not belong to an existing data flow (i.e., the packet is the first from its data flow received at the network element), the process initializes (at 550) a new counter for the new data flow, with the counter storing the value in the IPv4 identification field of the IP header of the received packet. The process then ends.

The new counter, in some embodiments, is data stored along with a new list entry that identifies the 5-tuple of the packet as a new existing data flow.

The third stage 615 of FIG. 6 illustrates that at time T3 the middlebox 680 receives a new packet P10 of the first data flow F1 from the source endpoint 660. This stage also shows that the middlebox, as the result of receiving the first packet of the second data flow F2 at time T2, initialized a new local counter Flow2 with the value of the IPv4 identification field of the IP header of the first packet (1 in this example). This stage also shows that packet P1 of the second data flow F2 has been transmitted out of the middlebox and is being received by the destination endpoint 690. The middlebox at this stage has two separate local counters for the two separate data flows. The local counter Flow1 keeps track of the sequencing of packets belonging to the first data flow, and has a current value of 9, while the local counter Flow2 keeps track of the sequencing of packets in the second data flow and has a current value of 1. In addition, between the last packet in the data flow F1 received by the middlebox (packet P9) and the next packet of the data flow F1 that the middlebox is going to receive (packet P10), no packet has been lost or missed.

Returning again to FIG. 5, when the process 500 determines (at 560) that the value of the IPv4 identification field of the received packet is not equal to the value of the incremented sequence counter for the data flow of the received packet, the process flags (at 570) a missing packet and updates (at 580) the local counter for the data flow of the received packet with the value of the IPv4 identification field of the received packet. The process then ends. It should be understood that a missing packet flag does not necessarily translate to loss of the packet. For instance, in some embodiments, the middlebox (or the destination endpoint for that matter) may not receive all the packets of a data flow sequentially only because the packets of the same data flow have been transmitted via different paths or links of the network. For example, the intervening network (between the source and the network element performing process 500) might change, or a router might be performing equal-cost-multi-path forwarding in such a way that does not keep all the packets of a data flow along the same physical path.

The fourth stage 620 of FIG. 6 illustrates that at time T4 the middlebox 680 receives a new packet P13 of the second data flow F2 from the source endpoint 660. This stage also shows that the sequencing counter Flow1 holds the value 100 for the first data flow F1 (because packet P100 of flow F1 has recently been processed by the middlebox), while the sequencing counter Flow2 holds the value 1 for the second data flow F2. After receiving the packet P13 of the second data flow, the middlebox 680 will increment its counter for this data flow to 2 and compare this incremented value with the value stored in the IPv4 identification field of the packet (13). Since the two values are not the same, the middle box raises a missing (or non-receipt) packet flag and then updates the sequencing counter Flow2 with the value of the IPv4 identification field (13). Based on the numbers of this example, the middlebox has discovered that it has not received packets 2-12 in the second data flow F2. These missing packets are either lost, or simply diverted to a different link of the network.

III. Calculating Packet Transmission Rate

In some embodiments, the sequential values inserted in the IPv4 identification fields of the IP headers of the packets received at the destination endpoint or captured by a network element are used to evaluate the packet transmission rate for a particular data flow. In order to perform such evaluations, instead of capturing every single packet and sampling the packets on a continuing basis, some embodiments simply calculate the difference in the inserted values of the IPv4 identification fields of two packets that are captured at two different points of time. The network element then determines the packet transmission rate of the data flow based on such calculation. The discovered errors and the calculated transmission rates can then be used by the network administrator, the endpoints, and/or the middle boxes, in order to optimize the transmission of the data flows in TCP/IP networking.

Figure 7:
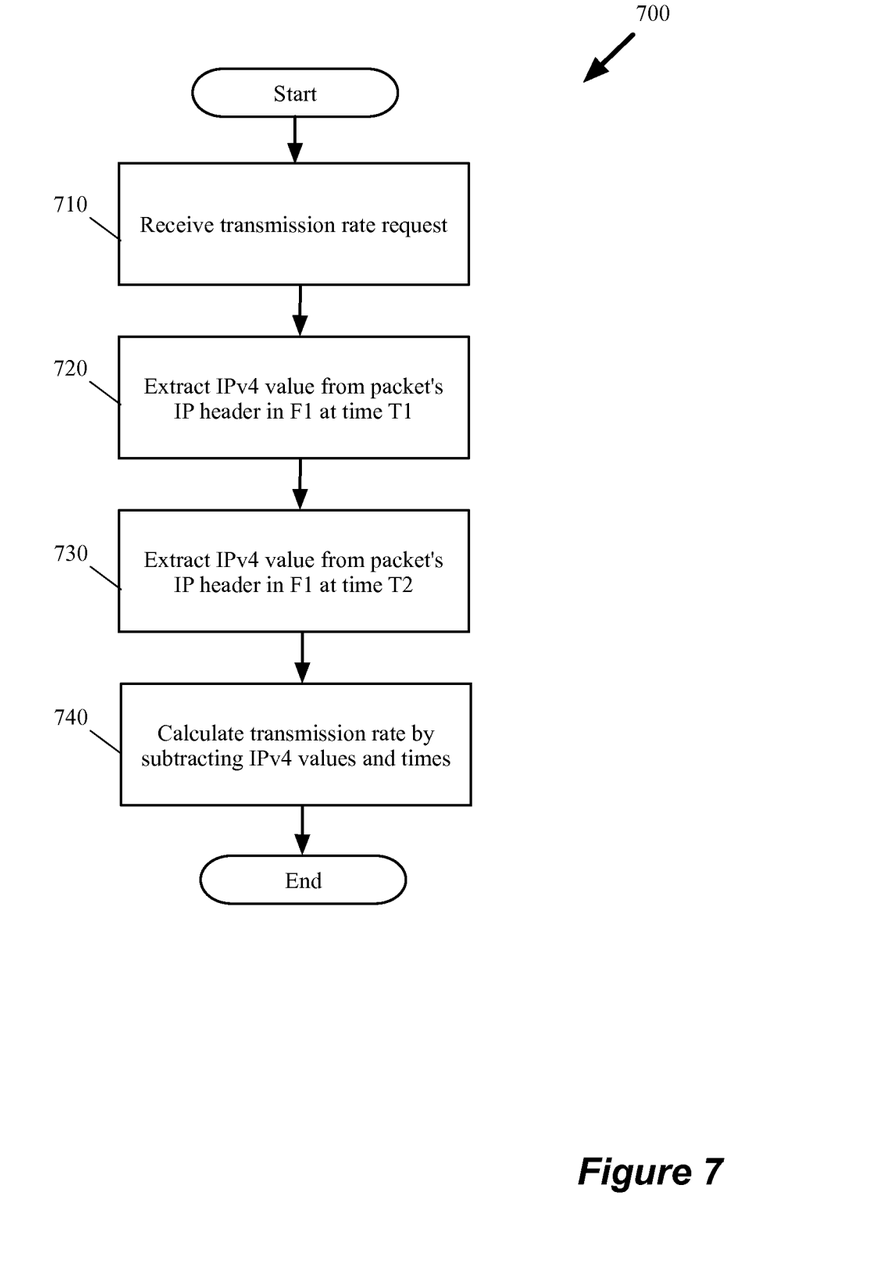
FIG. 7 conceptually illustrates a process of some embodiments that evaluates the packet transmission rate in a data flow.

FIG. 7 conceptually illustrates a process 700 of some embodiments that evaluates the packet transmission rate of a data flow. In some embodiments, the process 700 is implemented by a destination endpoint while in other embodiments the process is implemented by a network element (e.g., a forwarding element, a middlebox, etc.) along the transmission path of the data flow. FIG. 7 will be described by reference to FIG. 8 which illustrates an example of how the process 700 evaluates the packet transmission rate.

The process 700 begins by receiving (at 710) a request for evaluation of the packet transmission rate. The request in some embodiments is received from a network administrator. In some other embodiments, the request is scheduled to be sent to the destination endpoint or the middlebox periodically and at certain time intervals. In some embodiments, the request is the result of an internal process of the network element or destination endpoint to evaluate the packet transmission rate. Upon receipt of the request, the process extracts (at 720) the value of the IPv4 identification field from the IP header of the next packet of the data flow that the forwarding element receives. The process of some embodiments records the extracted value along the time that the packet was received (e.g., in a particular data structure).

Figure 8:
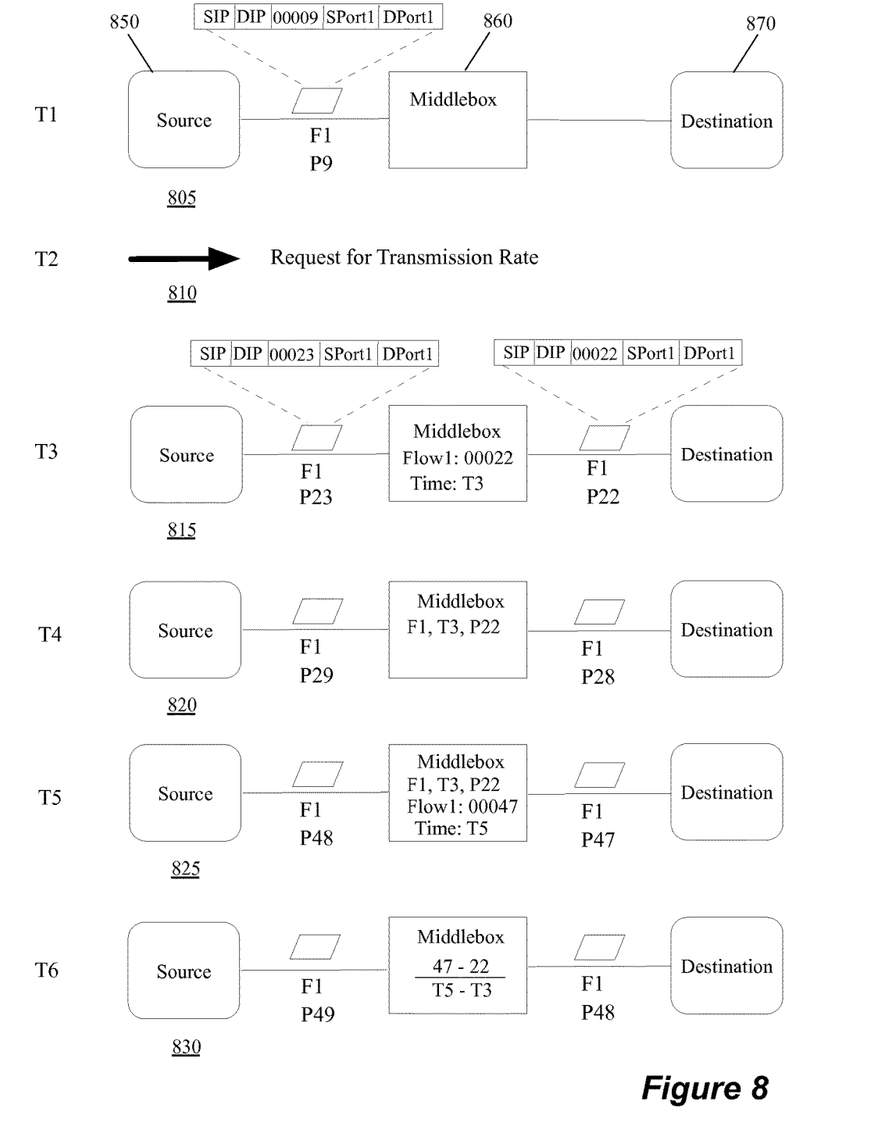
FIG. 8 illustrates how a middle box evaluates the packet transmission rate of a data flow without sampling every packet that it receives.

FIG. 8 illustrates, in six different stages 805-830, how a middlebox evaluates the packet transmission rate of a data flow without sampling every packet that the middlebox receives. The first stage 805 is similar to the first stage 605 of FIG. 6, except in this stage instead of showing different applications as the originators of different data flows, only the source endpoint 850 is shown as the originator of the flows. The first stage 805 shows that at time T1 the middlebox 860 receives the packet P9 of the data flow F1 from the source endpoint 850. As stated above, the middlebox 860 could be a load balancer, firewall, etc. In addition, the packet transmission rate evaluation can be performed by a forwarding element such as a router in other embodiments. The IP header of the packet P9 includes the source IP address SIP, the destination IP address DIP, and the IPv4 identification field that carries the value 9, meaning that this is the $9^{th}$ packet in the first data flow F1 that is transmitted by the source endpoint. Additionally, the TCP header of the packet P9 includes the source transport port SPort1 and the destination transport port DPort1 as the source and destination transport ports of the packet.

The second stage 810 illustrates that at time T2 a request for evaluation of the packet transmission rate is received by the middlebox. The request, as stated above, could be received from a network administrator as a one-time request or periodically (e.g., at certain time intervals or could be the result of an internal process on the middlebox). The third stage 815 illustrates that after the request is received, at time T3, the middlebox extracts the value of the IPv4 identification field in the IP header of the next packet that it receives, which in this example is the value 22. The middlebox then records the capture time of the packet (i.e., T3) as well as the extracted value (i.e., 22). This stage also shows that the middlebox 860 is going to receive the packet P23 of the data flow F1 from the source endpoint 850. Additionally, the middlebox 860 has transmitted the packet P22 of the data flow F1 towards the destination endpoint 870.

Returning to FIG. 7, after extracting the first IPv4 value, the process 700 extracts (at 730) the value of the IPv4 identification field from the IP header of a second packet that is received after a certain amount of time is lapsed. The laps of time, in some embodiments, can be set by a network administrator. In other embodiments the lapse of time can be set as a fixed period of time so long as the time is long enough to include a sufficient number of packets and short enough that the connection is not likely to timeout. The process records the second extracted value captured from the second packet along the time that the second packet was received (e.g., in the same particular data structure). The process then calculates (at 740) the packet transmission rate by subtracting the first IPv4 value from the second IPv4 value and dividing the result by the result of subtraction of the first packet capture time (T1) from the second packet capture time (T2). The process then ends.

The fourth stage 820 of FIG. 8 illustrates that at time T4 the middlebox 860 receives a new packet P29 of the first data flow F1 from the source endpoint 850. This stage also shows that the middlebox has recorded only the result of the first sampling of the packets. That is, the middlebox has recorded the capture time and IPv4 identification field value of packet P22. In other words, the middlebox does not care about the IPv4 identification field values of the packets it has received before the time T3. Similarly, because at time T4, the predefined amount of time has not lapsed yet, the middlebox does not record the time or IPv4 identification field of packet P29 either.

The fifth stage 825 illustrates that at time T5, the middlebox is scheduled to extract the second value from the packet that it has received. The middle box, therefore, has extracts the value of the IPv4 identification field from the IP header of the packet P47, which in this example is the value 47. In other words, the middlebox records that at time T5 it has had the $47^{th}$ packet of the data flow F1. This stage also shows that the middlebox 860 receives the packet P48 of the data flow F1 from the source endpoint 850. Additionally, the middlebox 860 has transmitted the packet P47 of the data flow F1 towards the destination endpoint 870.

The sixth stage 830 illustrates that after recording the IPv4 identification field values of the sampled packets and the capture times of the sampled packets, the middlebox evaluates the packet transmission rate. The middlebox does so by subtracting the IPv4 identification field values and the times, and then dividing the results. That is, the middlebox subtracts the IPv4 identification field value of the packet captured at time T3 (i.e., the value 22) from the IPv4 identification field value of the packet captured at time T5 (i.e., the value 47) and then divides the result by the result of subtraction of the first packet capture time (T3) from the second packet capture time (T5).

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
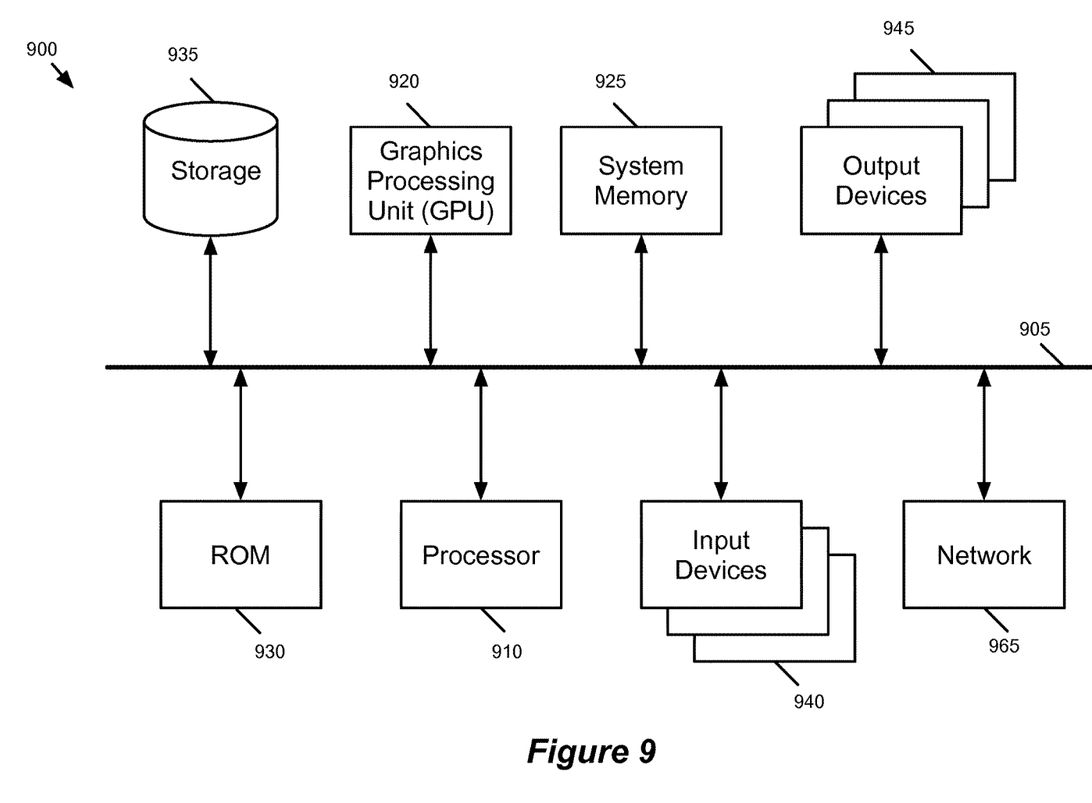
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash memory device, etc., and its corresponding drive) as the permanent storage device. Like the permanent storage device 935, the system memory 925 is a read-and-write memory device. However, unlike storage device 935, the system memory 925 is a volatile read-and-write memory, such a random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 5, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for sequencing packets of a data flow between two endpoints of a network, the method comprising:
   at a source data compute node (DCN), receiving a first packet and a second packet to transmit to a destination endpoint;
   determining that the first packet is an initial packet of a first data flow received from a first application executing on the DCN and the second packet is an initial packet of a second data flow received from a second application executing on the DCN;
   inserting a first initial value into a particular header location of the first packet before transmitting the first packet towards the destination endpoint;
   inserting a second initial value into the particular header location of the second packet before transmitting the second packet towards the destination endpoint; and
   for each subsequent packet in each data flow:
     incrementing a value inserted into the particular header location of a previously-transmitted packet of the data flow; and
     inserting the incremented value into the particular header location of the subsequent packet.

2. The method of claim 1, wherein inserting the value comprises storing the value in a particular field of an Internet Protocol (IP) header of the packet.

3. The method of claim 2, wherein the particular field of the IP header of the packet is an IP version 4 (IPv4) identification field of the IP header of the packet.

4. The method of claim 2 further comprising setting a Do Not Fragment (DNF) bit in the IP header of the packet in order to prevent a fragmentation of the packet during transmission from the source endpoint to the destination endpoint.

5. The method of claim 1, wherein the packets of the first and second data flows are sequenced independent of each other in order to identify potential packet transmission errors in each data flow at only one observation point.

6. The method of claim 1, wherein the source endpoint is a first DCN, wherein the destination endpoint is a second DCN.

7. The method of claim 6, wherein the first and second DCNs are virtual machines executing on two different host machines.

8. A method for sequencing packets of a data flow between two endpoints of a network, the method comprising:

at a first edge forwarding element of a first host machine, receiving a first packet and a second packet to transmit to a second edge forwarding element of a second host machine;

determining that the first packet is an initial packet of a first data flow and the second packet is an initial packet of a second data flow;

inserting a first initial value into a particular header location of the first packet before transmitting the first packet towards the second edge forwarding element;

inserting a second initial value into the particular header location of the second packet before transmitting the second packet towards the second edge forwarding element; and for each subsequent packet in each data flow:
incrementing a value inserted into the particular header location of a previously-transmitted packet of the data flow; and
inserting the incremented value into the particular header location of the subsequent packet, wherein the first and second packets received from a data compute node executing on the first host machine.

9. The method of claim 8, wherein the packets are sequenced in order to identify, at only one observation point, a set of packet transmission errors that occurs during packet transmission between the first and second edge forwarding elements, wherein the set of packet transmission errors comprises at least one of a packet loss, a packet duplication, and an out-of-order packet delivery.

10. The method of claim 9, wherein the observation point is one of the second edge forwarding element, a forwarding element along a transmission path between the first and second edge forwarding elements, and a middlebox along the transmission path.

11. The method of claim 9, wherein the observation point identifies the set of packet transmission errors by:
storing an IPv4 identification field value of the first packet of the first data flow in a local variable; and
for each subsequent packet of the first data flow:
incrementing the local variable's value;
comparing the local variable's value with an IPv4 identification field value of the subsequent packet; and
when the local variable's value does not match the IPv4 identification field value, (i) reporting a packet transmission error and (ii) updating the value of the local variable with the IPv4 identification field value of the subsequent packet.

12. A non-transitory machine readable medium storing a program that when executed by at least one processing unit sequences packets of a data flow between a source endpoint and a destination endpoint in a network, the program comprising sets of instructions for:
at a first edge forwarding element of a first host machine, receiving a first packet and a second packet to transmit to a second edge forwarding element of a second host machine;
determining that the first packet is an initial packet of a first data flow and the second packet is an initial packet of a second data flow;
inserting a first initial value into a particular header location of the first packet before transmitting the first packet towards the second edge forwarding element;
inserting a second initial value into the particular header location of the second packet before transmitting the second packet towards the second edge forwarding element; and for each subsequent packet in each data flow:
incrementing a value inserted into the particular header location of a previously-transmitted packet of the data flow; and
inserting the incremented value into the particular header location of the subsequent packet, wherein the first and second packets are received from a data compute node executing on the first host machine.

13. The non-transitory machine readable medium of claim 12, wherein the packets are sequenced in order to identify, at only one observation point, a packet transmission rate of the data flow between the first and second edge forwarding elements, wherein the observation point is one of the second edge forwarding element, a forwarding element along a transmission path between the first and second edge forwarding elements, and a middlebox along the transmission path.

14. The non-transitory machine readable medium of claim 13, wherein the observation point identifies the packet transmission rate by:
identifying, at a first point of time, an IPv4 identification field value of a packet of the first data flow captured at the first point of time;
identifying, at a second point of time, an IPv4 identification field value of a packet of the first data flow captured at the second point of time; and
calculating the packet transmission rate based on (i) the first and second points of time and (ii) the IPv4 identification field values of the packets captured at the first and second points of time.

15. The non-transitory machine readable medium of claim 14, wherein the observation point calculates the packet transmission rate by:
subtracting the IPv4 identification field value of the first captured packet from the IPv4 identification field value of the second captured packet and storing the result in a first variable;
subtracting the first point of time from the second point of time and storing the result in a second variable; and
dividing the first variable by the second variable.

16. A non-transitory machine readable medium storing a program that when executed by at least one processing unit sequences packets of a data flow between a source endpoint and a destination endpoint in a network, the program comprising sets of instructions for:
at a first data compute node (DCN) executing on a first host machine, receiving a first packet and a second packet to transmit to a second DCN executing on a second host machine;
determining that the first packet is an initial packet of a first data flow and the second packet is an initial packet of a second data flow;
inserting a first initial value into a particular header location of the first packet before transmitting the first packet towards the second DCN;
inserting a second initial value into the particular header location of the second packet before transmitting the second packet towards the second DCN; and
for each subsequent packet in each data flow:
incrementing a value inserted into the particular header location of a previously-transmitted packet of the data flow; and
inserting the incremented value into the particular header location of the subsequent packet.

17. The non-transitory machine readable medium of claim 16, wherein the packets are sequenced in order to identify, at only one observation point, a packet transmission rate of the data flow between the first and second DCNs.

18. The non-transitory machine readable medium of claim 16, wherein the first data compute node is a first virtual machine (VM) and the second data compute node is a second VM.

19. The non-transitory machine readable medium of claim 18, wherein the first VM receives the first data flow from a first application that executes on the first VM while the second VM delivers the first data flow to a second application that executes on the second VM.

20. The non-transitory machine readable medium of claim 16, wherein the first DCN receives the first and second data flows from first and second applications that execute on the first DCN.

* * * * *